United States Patent
Mokhbery et al.

(10) Patent No.: US 10,309,855 B2
(45) Date of Patent: Jun. 4, 2019

(54) TORQUE SENSING SYSTEM WITH WIRELESS TWO-WAY COMMUNICATION

(71) Applicant: FUTEK Advanced Sensor Technology, Irvine, CA (US)

(72) Inventors: Javad Mokhbery, Irvine, CA (US); Amirreza Mehran, Laguna Niguel, CA (US); Ehsan Niroomand, Aliso Viejo, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 307 days.

(21) Appl. No.: 15/244,137

(22) Filed: Aug. 23, 2016

(65) Prior Publication Data

US 2018/0058969 A1    Mar. 1, 2018

(51) Int. Cl.
   *G01L 3/10*    (2006.01)
   *G01L 25/00*    (2006.01)

(52) U.S. Cl.
   CPC ............ *G01L 25/003* (2013.01); *G01L 3/108* (2013.01)

(58) Field of Classification Search
   CPC .................................................... G01L 25/003
   USPC ......................................................... 73/1.11
   See application file for complete search history.

(56) References Cited

U.S. PATENT DOCUMENTS

| | | | | |
|---|---|---|---|---|
| 3,557,627 | A * | 1/1971 | Kugath | ................... B64C 13/04 318/651 |
| 6,873,931 | B1 * | 3/2005 | Nower | ................. G01B 11/272 702/151 |
| 8,264,374 | B2 | 9/2012 | Obatake et al. | |
| 2004/0045373 | A1 * | 3/2004 | Kwun | ..................... G01L 3/102 73/862.331 |
| 2012/0119919 | A1 | 5/2012 | Chen | |
| 2017/0167287 | A1 * | 6/2017 | Jacobs | ................. F01D 21/003 |

FOREIGN PATENT DOCUMENTS

| | | |
|---|---|---|
| CN | 203630942 U | 6/2014 |
| CN | 204142846 U  *  | 2/2015 |

OTHER PUBLICATIONS

Fu et al. Translation of CN204142846. Published Feb. 2015. Translated Mar. 2019. (Year: 2015).*

* cited by examiner

*Primary Examiner* — Walter L Lindsay, Jr.
*Assistant Examiner* — Philipmarcus T Fadul
(74) *Attorney, Agent, or Firm* — Young Basile Hanlon & MacFarlane, P.C.

(57) ABSTRACT

A torque sensing system which includes a torque sensor capable of wirelessly communicating torque and misalignment data to a smartphone or a tablet using a protocol such as Wi-Fi or Bluetooth technology, and wirelessly communicating commands from the smartphone or table back to the torque sensor. The torque sensor electronics include an rf coil for taking power off of a stationary housing to a rotary shaft and one or more accelerometers for indicating misalignments.

5 Claims, 14 Drawing Sheets

TORQUE SENSING SYSTEM WITH WIRELESS TWO-WAY COMMUNICATION

FIELD OF THE INVENTION

The invention described herein is a torque sensing system wherein the torque sensor is capable of two-way wireless communication via Wi-Fi and/or Bluetooth with smartphones and tablets having both data display and command input capabilities. The wireless communication can use Wi-Fi, Bluetooth or other technology. The sensor can provide one-way communication of torque-related data to various conventional devices including laptops and hand-held displays via analog cable connection while, at the same time, providing two-way wireless communication to smartphones and tablets.

BACKGROUND OF THE INVENTION

Electronic torque sensors are used to produce signals carrying data in analog format from the sensor output to conventional display devices via a cable connection. The data communication is one-way; i.e. from the sensor electronics to the display device.

This communication format substantially limits the range or distance between the sensor electronic and the display device; i.e. they must essentially be in the same room. It also prevents the user from instantaneously changing or adjusting parameters such as threshold and/or range values for the monitored metrics, or changing units of measurement. Moreover, state of the art systems do not provide an indication of misalignment of torque transmitting components such as shafts in a rotary torque sensor wherein the misalignments can occur either during installation or in operation or both. Such misalignments can substantially and negatively impact the quality of the data being communicated.

SUMMARY OF THE INVENTION

The torque sensing system disclosed herein provides improvements in torque sensors in which a principal benefit is the capability to provide wireless two-way communication from the sensor electronics to smartphones and/or tablets thereby to enable the user not only to read and record data but also to input commands to the system that can change or adjust metrics such as, but not limited to, threshold values, ranges and units of measurement, in real time; i.e. without the need to shut the system down to reprogram onboard processors and the like. The system can, for example, trigger an alert in the smartphone or tablet when data values exceed pre-established values.

In addition, the system herein described can provide real time indications of torque and other metrics such as rotational speed and system misalignments occurring either during installation or while the system is in operation or both. In general, this capability is provided by mounting various instrumentation on the torque transmitting shafts including strain gages wired into a Wheatstone bridge circuit to provide torque signals, an encoder to provide speed signals, and accelerometers to provide misalignment signals to a processor on the shaft. The signals are then sent by an rf coupling to a processor on the sensor housing. The housing processor, in turn, supplies data to a wireless transmission system using either Wi-Fi or Bluetooth technology by way of an antenna on the sensor housing. This can substantially increase the range, allow real time changes or adjustments in various metrics and also allow data to be transmitted from a smartphone to a receiver location hundreds or even thousands of miles away.

The disclosure herein presumes that the reader is familiar with strain gage technology wherein a foil type variable resistor is mounted on a structural component that exhibits a physical characteristic that allows it to elastically flex. The strain gage, or a set of strain gages, is mounted in a flexure zone in the structural component such that the resistance of the strain gage or gages changes in portion to the degree of flexure experienced while, for example, transmitting torque. The variation in resistance is readily converted by a Wheatstone bridge circuit shown in FIG. 19 to a variable voltage that can be processed by known electronics such as analog-to-digital converters and conventional microprocessors.

BRIEF DESCRIPTION OF THE DRAWINGS

The various features, advantages and other uses of the present asset management and control apparatus will become more apparatus referring to the following description and drawing in which.

DETAILED DESCRIPTION OF THE ILLUSTRATIVE EMBODIMENTS

Figure 1:
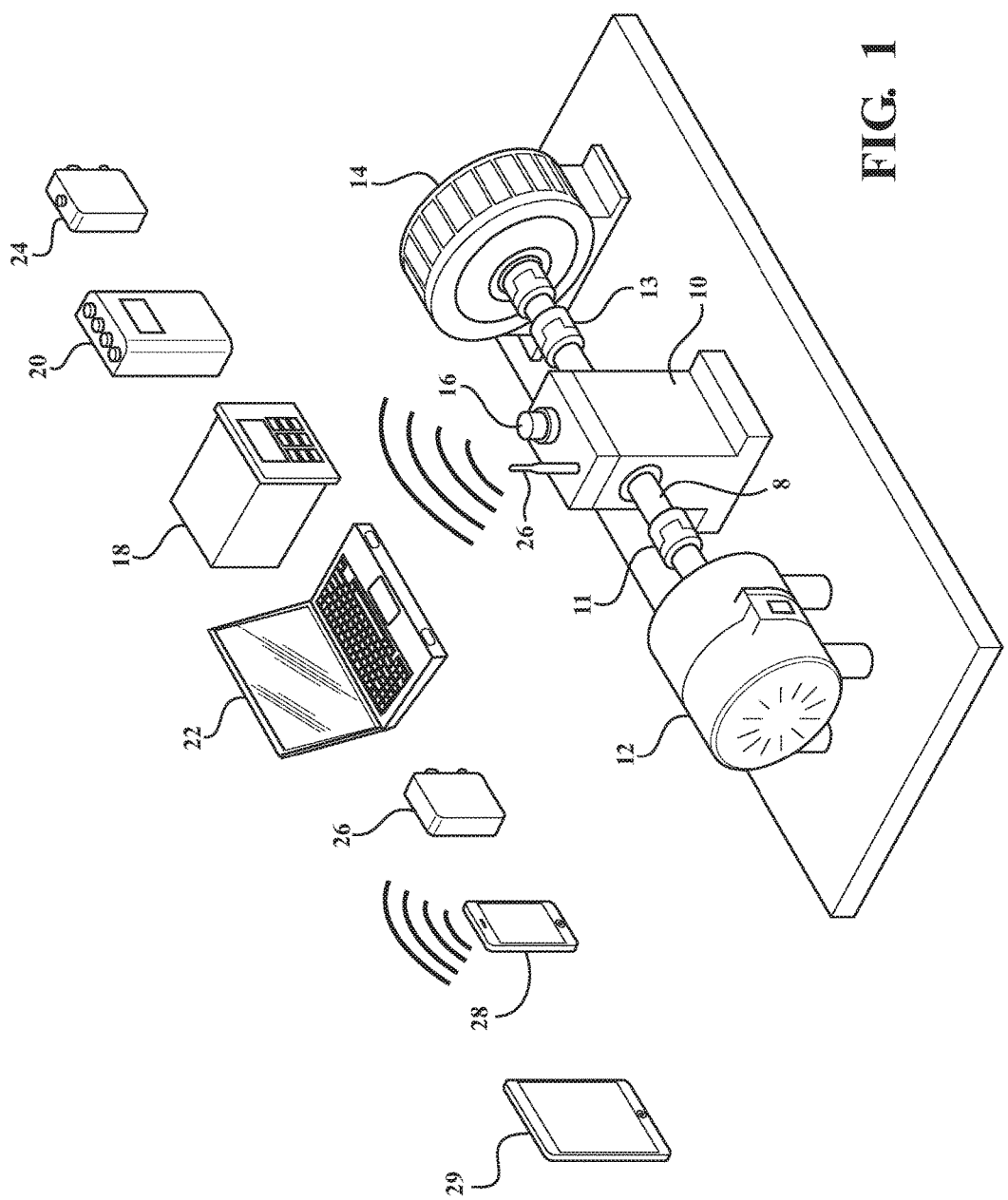
FIG. 1 shows a torque transmitting and sensing system in accordance with the present invention using an electric motor as the drive and an eddy current brake as the load and using a FUTEK rotary torque sensor to provide data which can be communicated both by cable and Wi-Fi or Bluetooth technology to variety of devices.

FIG. 1 shows a torque sensing system comprising the combination of a modified FUTEK model TRS300 rotary torque sensor 10 having a strain gage instrumented 8 connected through a coupling 11 to an electric motor 12 and through a coupling 13 to an Eddy current brake 14 acting as a load. The motor 12 supplies mechanical power that is transmitted through the shaft to the brake 14. The load flexes the shaft 8 within the sensor housing in proportion to transmitted torque.

The torque sensor 10 comprises electronics including suitably located strain gages and processors for producing electrical signals representing various metrics of transmitted torque. These metrics can be coupled from the torque sensor 10 via a cable connector 16 directly to one or more of a digital display 18, a hand-held display 20 and/or a laptop computer 22 by way of a USB port 24.

In addition, the metrics produced by the electronics within the torque sensor 10 can be communicated wirelessly by way of antenna 26 to smartphone 28 or a tablet 29 using Wi-Fi and/or Bluetooth technology. In an implementation, as used throughout this disclosure, wireless communication can refer to a system for communicating data wirelessly between devices, including, without limitation, wireless versions of Internet, intranet, or Ethernet, Wi-Fi, Bluetooth, radio frequency, near field communication, code division multiple access, global system for mobile communications, long-term evolution, or the like. Unless explicitly indicated otherwise, references throughout this disclosure to Wi-Fi and/or Bluetooth can also or instead refer to any one or combination of the foregoing.

While the cable communication from connector 16 to the devices 18, 20 and 22 is one-way; i.e. from the torque sensor 10 to the devices 18, 20 and 22, the wireless data communication from the torque sensor 10 to the smartphone 28 is two-way in that the smartphone 28 or the tablet 29 can communicate commands back to the torque sensor 10 by way of either a Wi-Fi link or a Bluetooth link to alter the metrics and to perform other functions as hereinafter described.

In summary, the two-way transmission link between the torque sensor 10 and the smartphone 28 or tablet 29 enables the smartphone 28 or tablet 29 to receive the sensor output wirelessly via Wi-Fi and/or Bluetooth. After processing the transmitted output by the smartphone/tablet the user will be able see the following data displayed on the smartphone/tablet in real time:

1. Torque sensor analog output in VDC;
2. Instantaneous torque measured by the torque sensor 10 in any selected unit of measurement preferred by the user;
3. Torque sensor rotational speed in RPM or any other unit of measurement selected by the user;
4. Torque sensor rotational angle in degrees or any other unit of measurement selected by the user;
5. Temperature inside the torque sensor 10 in Fahrenheit or Celsius or any other unit of measurement selected by the user;
6. Misalignment occurring during installation through an accelerometer imbedded in the torque sensor as hereinafter in reference to FIGS. 7 and 10; and
7. Misalignment/instability during operation through the aforementioned accelerometer imbedded in the torque sensor 10.

In addition, the user can set threshold and/or range values for any of the above mentioned metrics to trigger an alert on the smartphone 28 or on a tablet. The user can log the above metrics in any spreadsheet available on the smartphone 28 or tablet 29 or in cloud storage.

As a further benefit of having a two-way link between the torque sensor 10 and the smartphone 28 or comparable tablet, the user can send commands to the torque sensor 10 wirelessly through Wi-Fi and/or Bluetooth enabling the user to;

1. Modify calibration data points and configuration of the torque sensor 10 wirelessly;
2. Modify the sampling rate or bandwidth of the torque sensor 10 wirelessly;
3. Enable or disable linearization features of the torque sensor 10 wirelessly, or
4. Perform shunt calibration remotely.

As indicated above, the two-way link between the torque sensor 10 and the smartphone 28 or tablet 29 can be established using the Bluetooth platform or, alternatively Wi-Fi can be used to institute the two-way communication link which can be done in any of three different ways:

1. Wi-Fi direct; this enables the communication between the torque sensor 10 and the smartphone 28 directly; or
2. Connection to the same Wi-Fi network; the torque sensor 10 and the smartphone tablet must be connected to the same Wi-Fi network in order to communicate with each other; or
3. Connection through a server; the torque sensor 10 is connected to a server through a Wi-Fi network. The user can use a different Wi-Fi network to connect to the same server in order to establish the link between the torque sensor 10 and the smartphone 28 or any computing device with capabilities of connection to a Wi-Fi network.

In the system of FIG. 1 the torque sensor 10 is an instrument with "strain gages" or other types of torque sensing elements that generate electrical signals in response to elastic deformation or twist in a flexure section of shaft 8 within the torque sensor housing. The torque sensor 10 is designed to send analog signals by way of a cable to the torque sensor connector 16 for use by any of the electronic systems illustrated in FIG. 1 including items 18, 20 and 22. Simultaneously the torque sensor is paired via Wi-Fi and/or Bluetooth wirelessly to the smartphone 28 through signal broadcast by the torque sensor antenna 16.

As stated above, the user can set the threshold and/or range values for any of the above mentioned metrics to trigger an alert on the smartphone 28.

Figure 2:
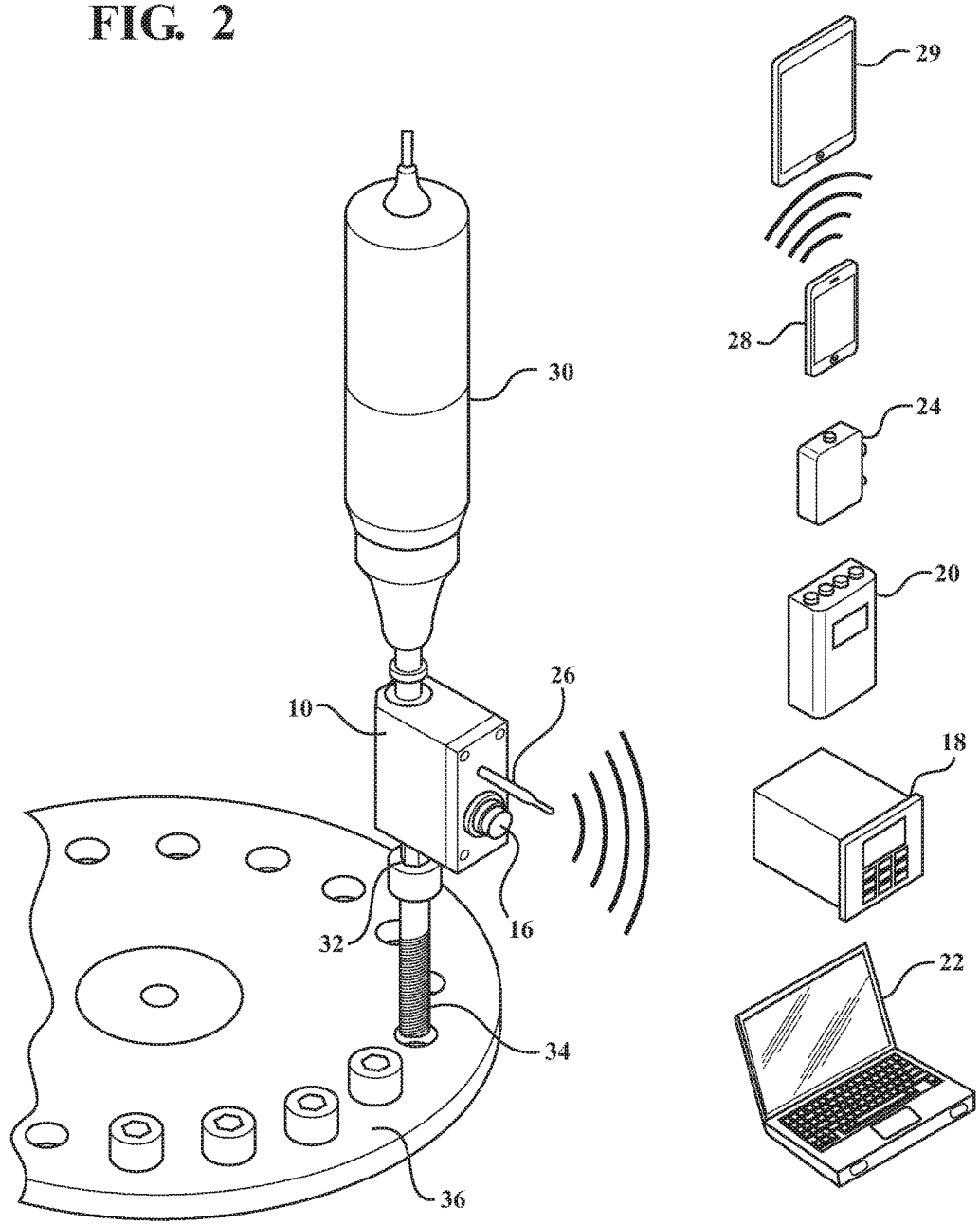
FIG. 2 is a diagram of another torque transmitting and sensing system using the same FUTEK torque sensor as previously described, but here placed between a high speed power tool and a screw/bolt driver used to install a series of threaded bolts driven into a steel plate to achieve a precise torque level.

Referring to FIG. 2, the torque sensor 10 is shown connected between a rotary power tool 30 and a bolt head driver 32 which, as shown, is in engagement with the head of a threaded fastener 34 being driven into a steel plate 36. The tool 30 operates at a high rotational rate and the torque sensor 10 ensures that the fastener 34 is properly torqued in as an end result of the fastening operation.

Once again, the torque sensor 10 is equipped with a cable connector 16 which can be connected to any of the devices 18, 20 and 22, the connection to computer 22 through the USB port 24.

Further, the torque sensor 10 is also equipped with an antenna 26 capable of wireless two-way communication with the smartphone 28 or tablet 29 as described above. The system shown in FIG. 2 can achieve all of the functions described above with respect to FIG. 1.

The FIG. 2 system is used to measure the torque and rotational angle delivered by the power tool 30 to verify it torque and rotational angle as it fastens bolts 34 into the fixed plate 36 using the torque sensor 10 instrumented as describe above and as will be apparent to person skilled in the art with strain gages or other types of torque censoring elements. The torque sensor 10 is designed to send analog signals by way the cable connection to any of the computing devices including any of the hand-held displays and/or the computer via USB port. Simultaneously the torque sensor 10 is paired with the smartphone 28 or tablet 29 via Wi-Fi or Bluetooth through the antenna 16.

The smartphone 28 displays the following in real time:
1. Rotary torque sensor output in VDC;
2. Instantaneous torque measured by the rotary torque sensor 10 in NM or any other unit of measurement selected by the user;
3. Rotational speed in RPM or any other unit of measurement selected by the user;
4. Rotational angle in degrees or any other unit of measurement selected by the user;
5. Rotational angle in degrees or any other unit of measurement can be distributed for any of the bolts or screws in the system;
6. Temperature inside the rotary torque sensor 10 in Fahrenheit or Celsius or any other unit of measurement selected by the user;
7. Misalignment occurring during installation; and/or
8. Misalignment or instability during operation as hereinafter described.

In addition, the user can set threshold values and/or range values using the smartphone 28 for any of the above mentioned metrics to trigger an alert on the smartphone 28 or tablet 29. The user can also log any of the above mention metric in any spreadsheet available on the smartphone 28 or tablet 29. In addition, the user is capable of sending commands to the rotary torque sensor 10 using the smartphone or tablet through Wi-Fi and/or Bluetooth. In this regard, the user is able to:
1. Modify calibration data points and configurations of the torque sensor 10 wirelessly in order to use the same sensor at different capabilities with different power tools with different power capabilities;
2. Modify the sampling rate of the rotary torque sensor 10 wirelessly for ease of data logging for long term testing;
3. Enable or disable linearization features of the rotary torque sensor 10 wirelessly to improve the accuracy of measurements in load points; and
4. Perform shunt calibration remotely.

Figure 3:
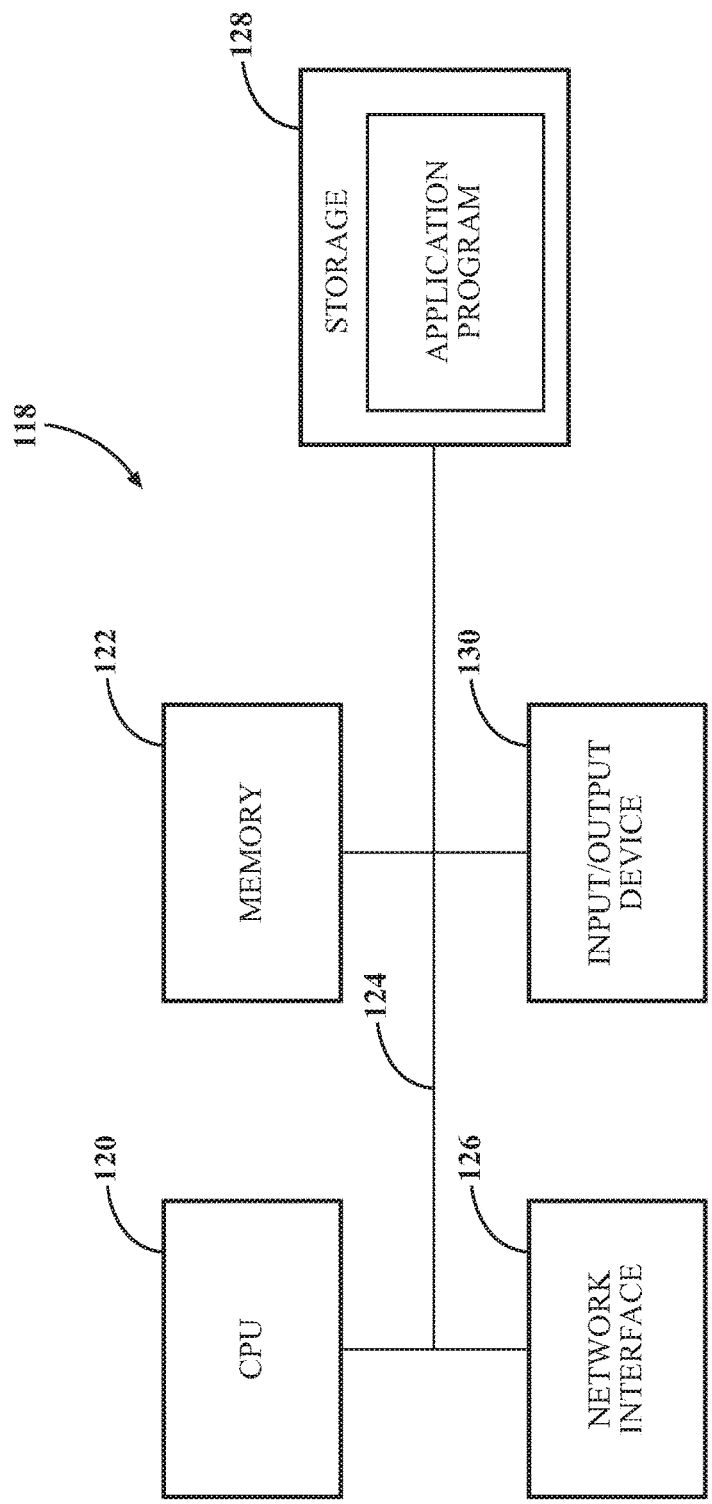
FIG. 3 is a block diagram of a computing device, such as a user device.

Referring to FIG. 3, a computing device 118 usable for one-way or two-way communication with the torque sensor 10 disclosed herein is shown. The computing device 118 can be a smartphone or tablet 28, a laptop computer 22, or other computing device comprising a CPU 120, a memory 122, and a network interface 126. The CPU 120 can be a conventional central processing unit and include single or multiple processors, each having single or multiple processing cores. Alternatively, the CPU 120 may include another type of device, or multiple devices, capable of manipulating or processing information now-existing or hereafter developed. The memory 122 can be RAM, DRAM, or any other suitable type of storage device. The memory 122 may include executable instructions and data for immediate access by the CPU 120. Alternatively, the memory 122 may include another type of device, or multiple devices, capable of storing data for processing by the CPU 120 now-existing or hereafter developed. The CPU 120 may access and manipulate data in the memory 122 via a bus 124. The network interface 126 may be any component configured to permit one- or two-way communication with the computing device 118, for example, over wireless communication. The CPU 120 may access and utilize the network interface 126 for data communication via the bus 124.

The computing device 118 can also include other components. For example, it can further include storage 128 and/or one or more input/output devices 130. The storage 128 can include executable instructions along with other data. Examples of executable instructions may include, for example, an operating system and one or more application programs for loading in whole or part into the memory and to be executed by the CPU 120. The storage 128 may comprise one or multiple devices and may utilize one or more types of storage, such as solid state or magnetic. An application program in the storage 128 can comprise executable instructions for receiving and processing data from torque sensor 10 and/or generating and transmitting requests or commands to the torque sensor 10. The one or more input/output devices 130 can include devices for receiving input from a user of the computing device and outputting data to the user. Examples of input devices can include keyboards, mice, and other controls. Examples of output devices can include a display, which may be implemented in various ways, including by a LCD, CRT, LED, OLED, or the like. In an implementation, the display can be a touch screen display configured to receive touch-based input, for example, in manipulating data output to the display.

Figure 4:
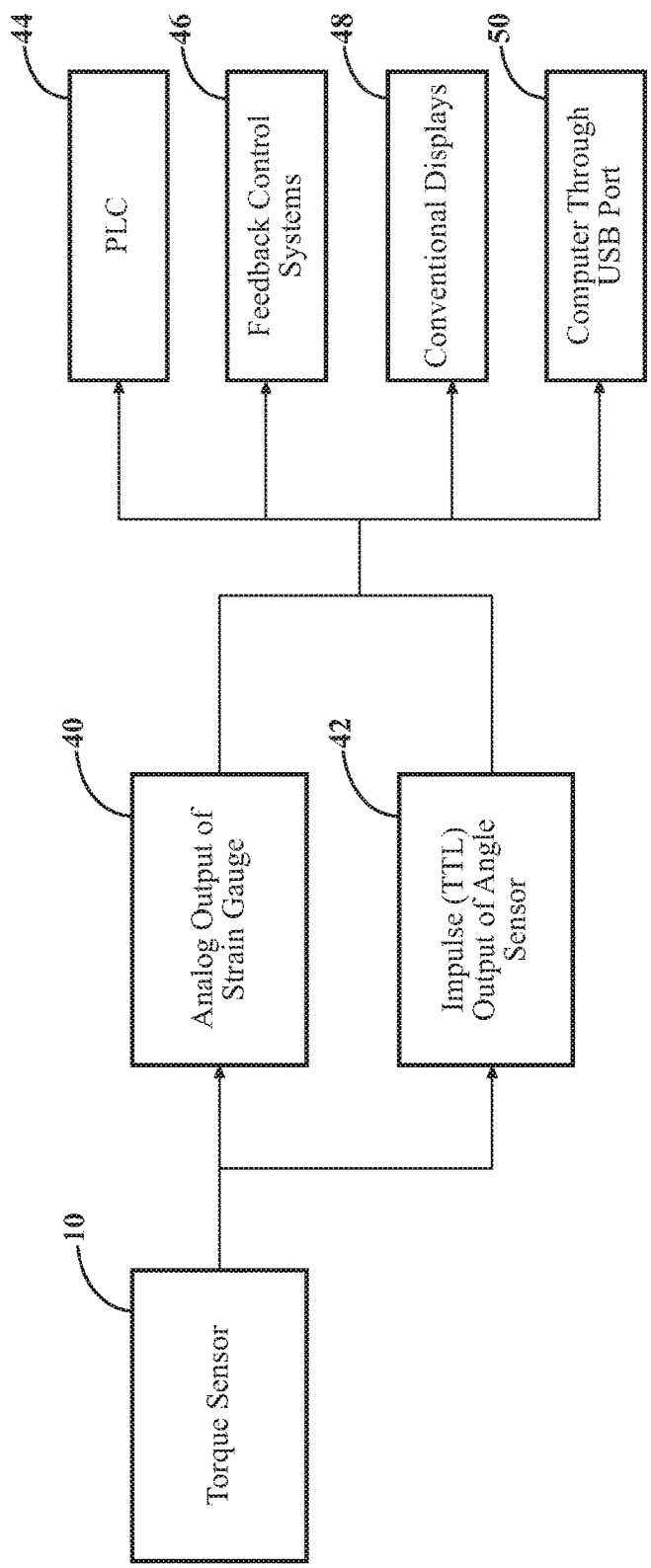
FIG. 4 is a block diagram of the cable coupled system in either or both of the systems of FIGS. 1 and 2.
Figure 5:
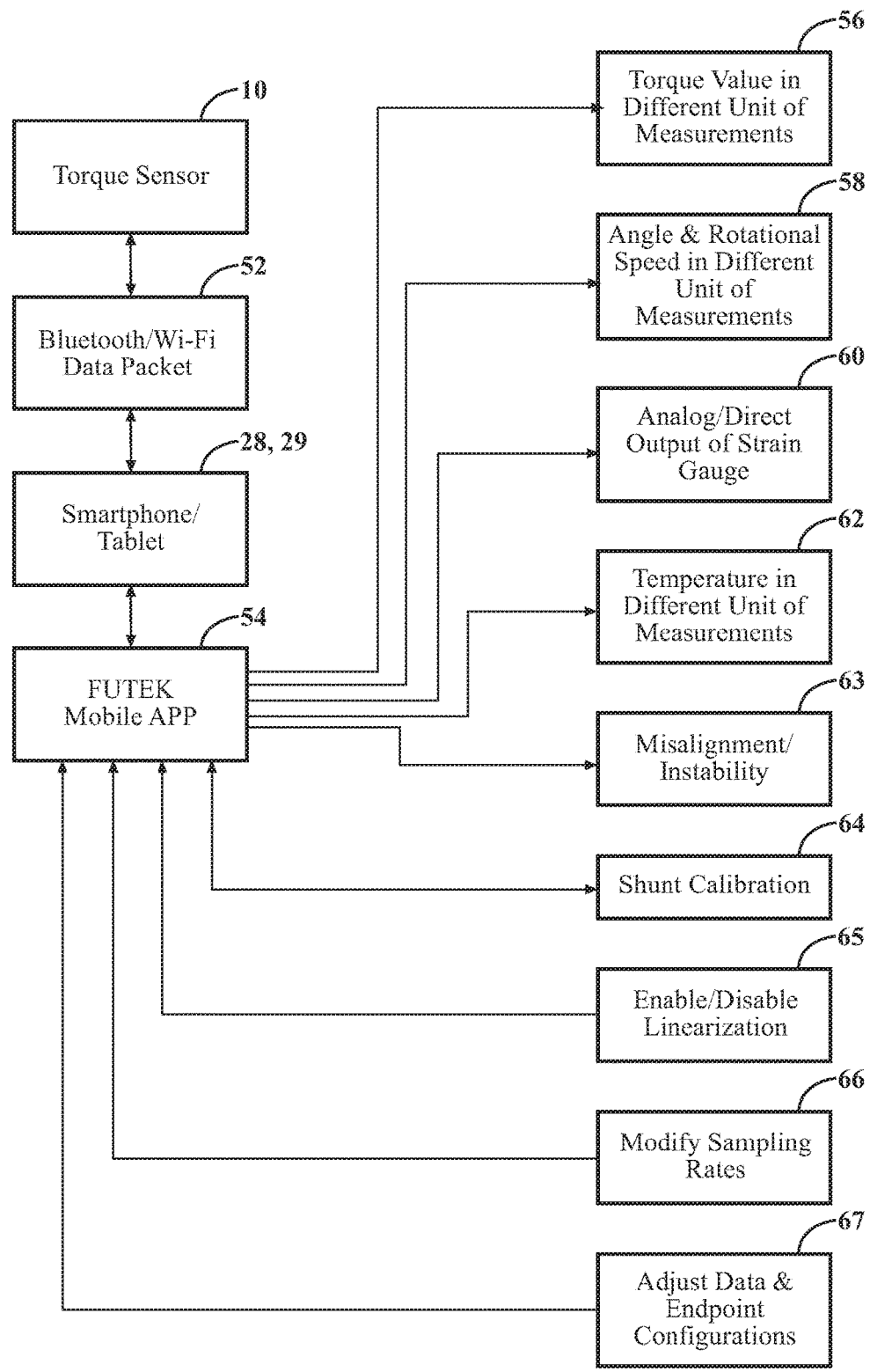
FIG. 5 is a block diagram of a Wi-Fi/Bluetooth communication system in either or both of the system of FIGS. 1 and 2.

Looking now to FIGS. 4 and 5, they are shown respectively, in block diagram the analog cable connection system and the wireless connections system, in this case by way of the Bluetooth data packet 52 to the smartphone 28 or tablet 29. In addition, as shown in FIG. 5, the smartphone/tablet, 28, 29 can be connected to a mobile app 54, which in turn, is capable of transmitting data to and from any of the elements shown in the right hand column of boxes 56, 58, 60, 62, 63, 64, 65, 66, and 67 with torque value 56 at the top and adjustment of data at endpoint configurations 67 at the bottom as described above.

Also present is the ability to log data to cloud storage, the ability to set threshold or range values to trigger an alert and a box indicating the capability of monitoring metrics.

Figure 6:
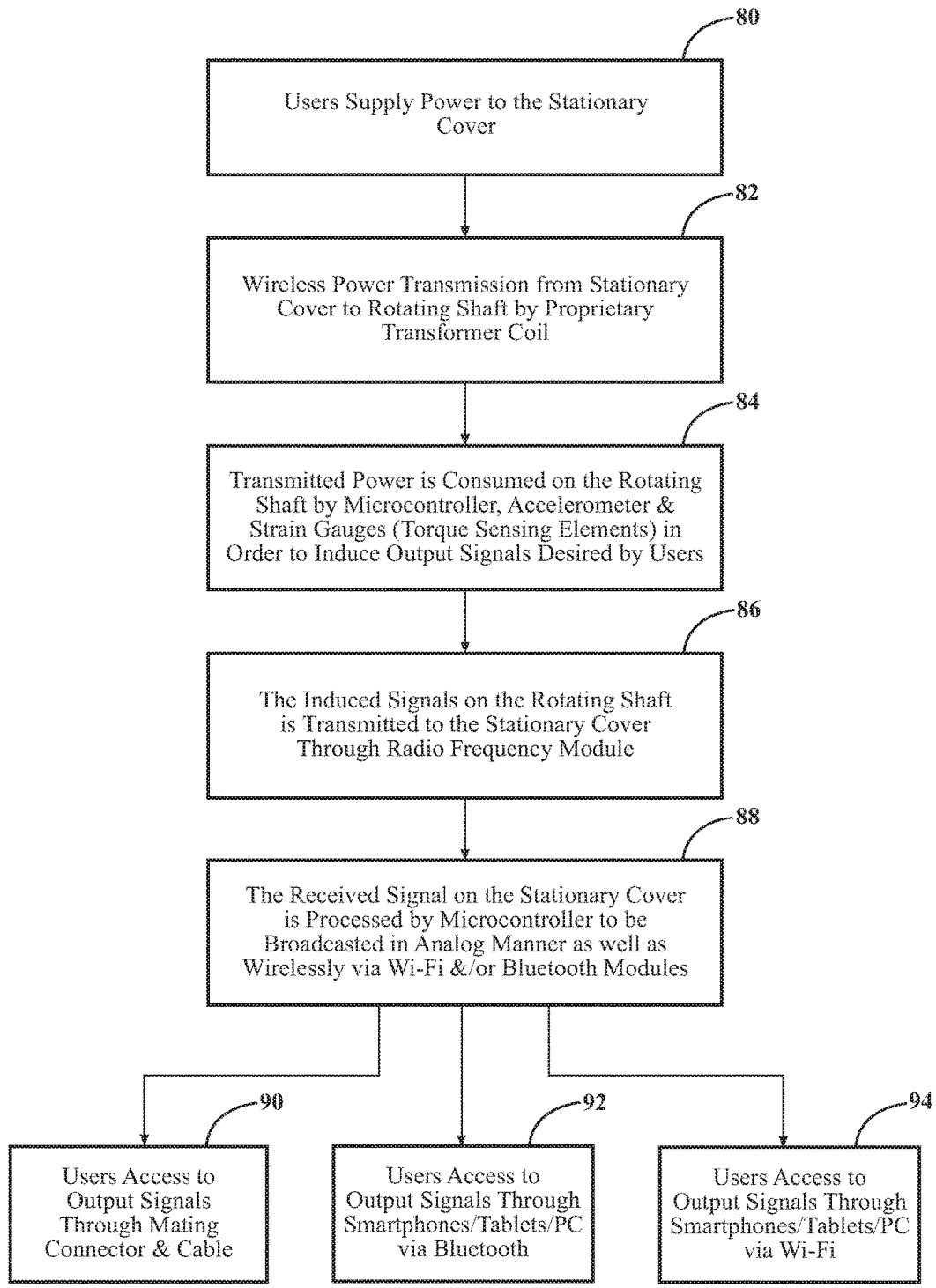
FIG. 6 is flow chart showing how the torque sensor communicates with a user device.

Referring now to FIG. 6, a flow chart entitled "Torque Sensor Communicating with Flowchart" is shown. The upper left box 80, shows the user supplying power to the stationary cover of the torque sensor 10. Elliptical step 82, indicates the wireless power transmission from the stationary cover of the torque sensor 10 to the rotating shaft of the sensor through transformer coil shown in each of FIGS. 8, 9 and 10.

Below that is step 84 showing the power being consumed on the rotating shaft by a microcontroller and by one or more accelerometers in strain gages with are the torque sensing elements in order to produce output signals as desired by the user.

The next step 86 in the flowchart is the use of the induced signals on the rotating shaft being transmitted to the stationary cover printed circuit board through the rf module.

As shown in step 88 the received signal on the stationary cover of the torque sensor 10 is processed by a microcontroller to be broadcast in analog form as well as wirelessly via Wi-Fi and/or Bluetooth modules to perform any of the steps 90, 92 and 94 as indicated by the legends in those blocks.

Figure 7:
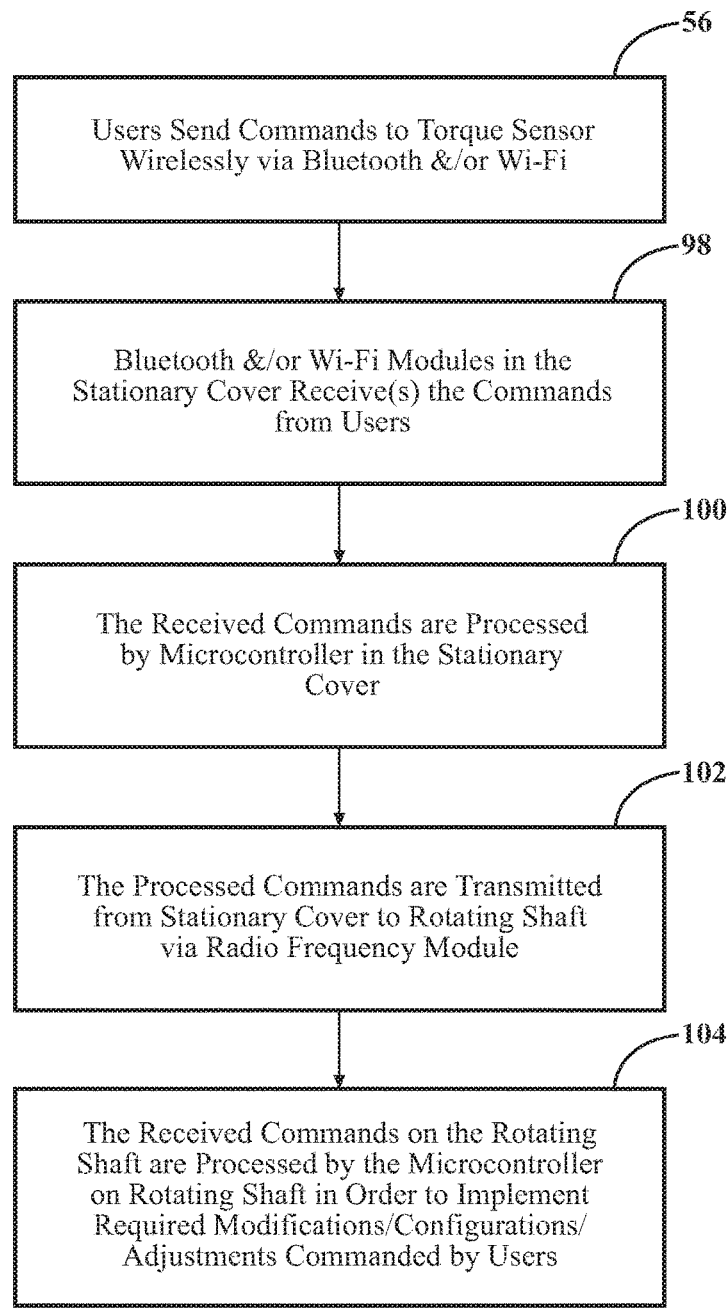
FIG. 7 a flow chart showing how a user device communicates with the torque sensor.

FIG. 7 illustrates the steps involved in the user communicating to the torque sensor by inputting commands from the smartphone/tablet 28, 29 keyboard to the electronics in the torque sensor 10. Step 96 shows the user sending commands to the torque sensor wirelessly by way of Bluetooth or a Wi-Fi connection 31. Step 98 shows the reception of the commands from the user whereas step 100 shows the commands being processed by a microcontroller in the stationary cover of the torque sensor 10.

Step 102 shows the process commands being transmitted from the stationary cover PCB to the rotating shaft by rf transmission module in PCB and step 104 shows the received commands on the rotating shaft being processed by the microcontroller on the rotating in order to implement to required modifications or configurations or adjustments commanded by the user.

Figure 8:
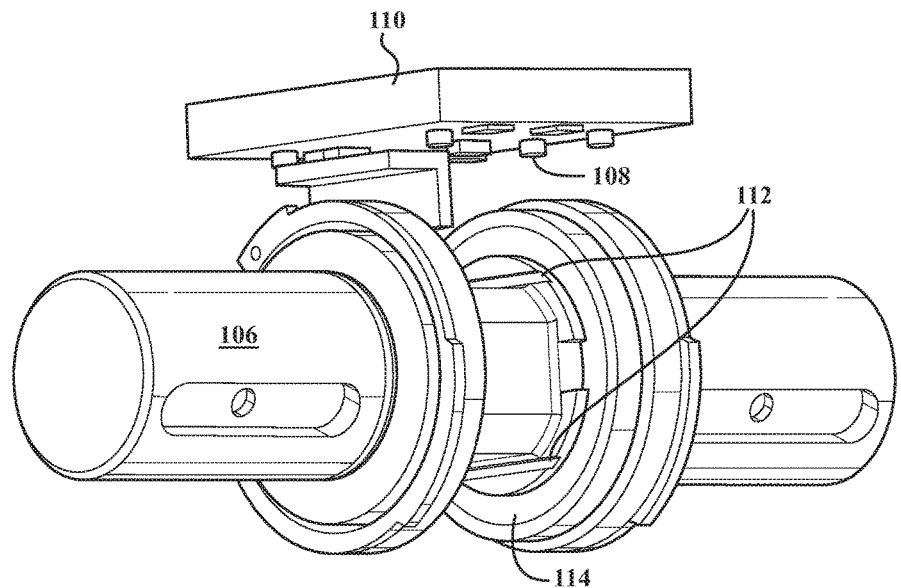
FIG. 8 shows interior detail of the torque-transmitting shaft and a cover on the torque sensor housing.

Referring now to FIG. 8, the shaft 106 of the torque sensor 10 is shown along with the printed circuit board 108 including a microcontroller on the housing cover 110 of the sensor 10. Reference numeral 112 indicates the mounting slots for the two PCBs 106*a* and 106*b* containing the accelerometers 112*a* and 112*b* (see FIGS. 15 and 16) which are mounted on the rotating shaft 106 and reference character 114 indicates the transformer coil which is used to transmit power using inductive coupling from the housing cover 110 to the electronics on the rotating shaft. An accelerometer is mounted on each PCB on the shaft 106. The measuring axis of each accelerometer is perpendicular to the shaft axis at "no torque." For instance, in the TRS300 the spacing between the shaft axis and the accelerometer is 0.741". At "no Torque," both accelerometers are oriented in parallel since the PCBs are mounted in parallel slots as described above. Torque being applied, the shaft gets twisted so that the PCBs and the accelerometers are no longer parallel. Therefore, at the higher torque values one sees greater differences in the measurements of the accelerometers with respect to one another.

Figure 9:
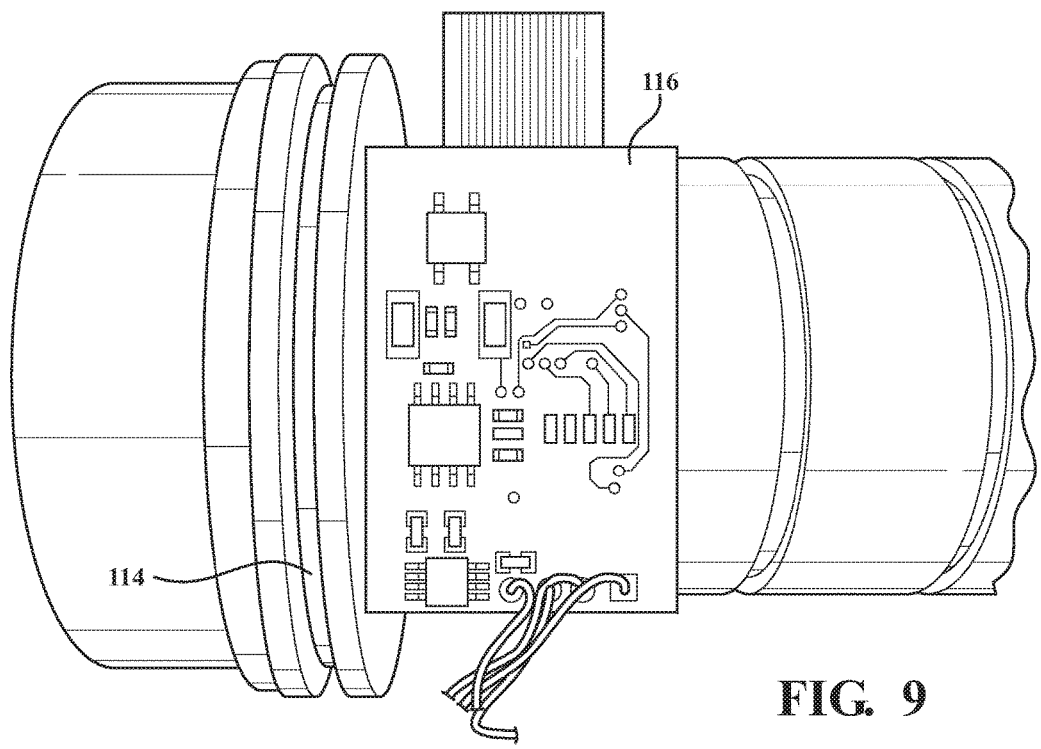
FIG. 9 is drawing of another shaft detail including a power input coil and a shaft mounted printed circuit board (PCB) including a microprocessor.

Referring to FIG. 9, the reference numeral 116 shows the printed circuit board (PCB) mounted on the shaft 106 whereas reference numeral 114 again identifies the two-part coil which is used to make inductive coupling to furnish power from the stationary housing to the electronics on the rotating shaft.

Figure 10:
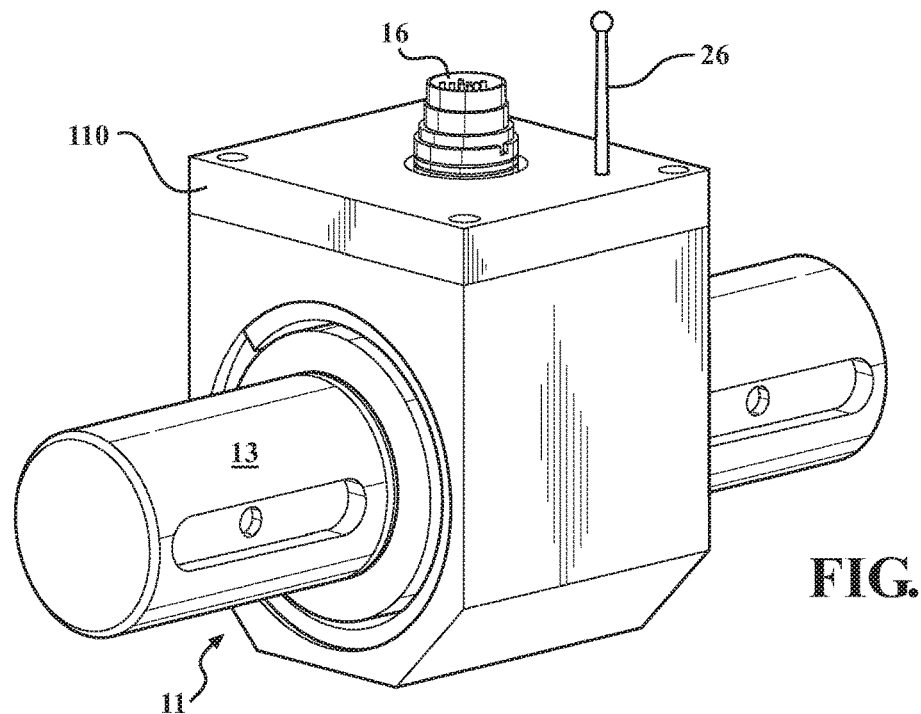
FIG. 10 is a perspective view of the torque sensor showing the housing and its cover with the Wi-Fi and/or Bluetooth antenna.

FIG. 10 shows the sensor 10 in greater detail to include a housing, the rotatable shaft 106, and the cover 110 which, on the inside surface thereof carries the printed circuit board (PCB) 108 shown in FIG. 8. The cable coupling 16 and Wi-Fi/Bluetooth antenna 26 are also shown.

Figure 11:
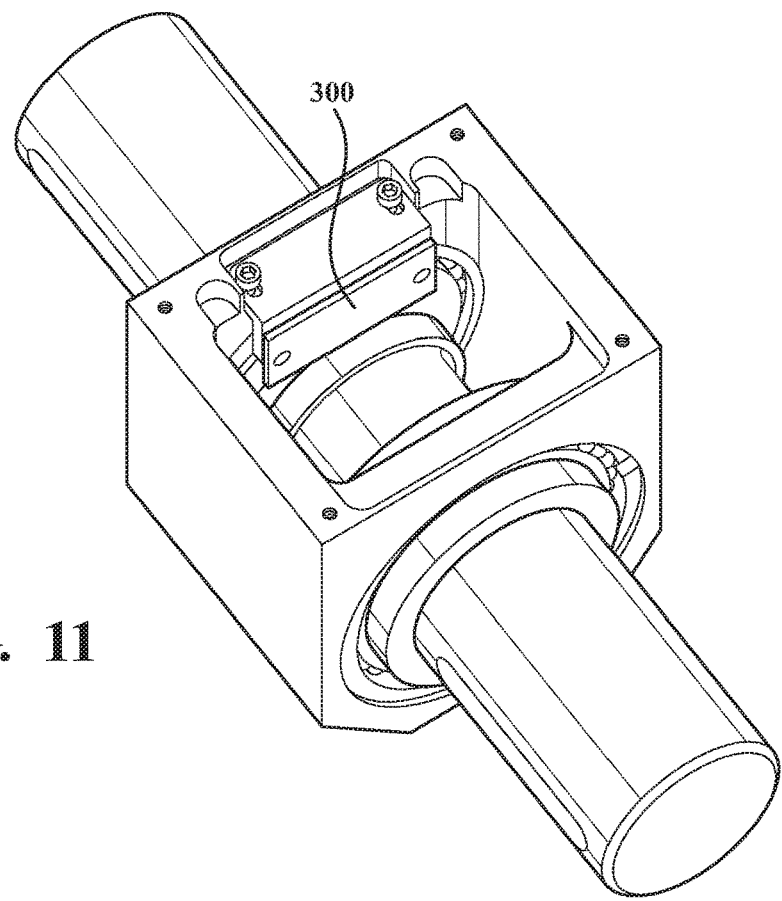
FIG. 11 is a perspective view of the sensor housing opened to show an encoder mounting location.

FIG. 11 shows the mounting of an encoder PCB 300 mounted on the inside of the housing sensor 10. Encoder 310 acts as an angle sensor and can be either optical or magnetic encoder for measurement of rotational angle and speed of the rotating shaft. For instance, Avtron item #ADKXL2202-900-41/38 (see attached spec sheet) could be used where the magnetic ring is mounted on the rotating shaft & the Encoder PCB is mounted on the stationary housing. When the shaft rotates, the magnetic ring spins with the shaft and the encoder PCB picks up the number of revolutions per second and feeds the microprocessor on the stationary housing accordingly.

Figure 12:
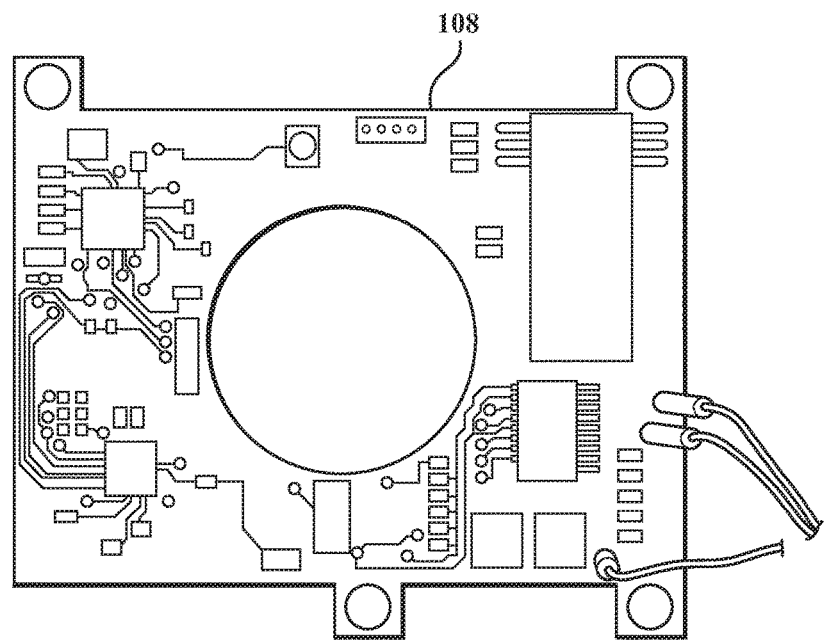
FIG. 12 is a view of the PCB which can be mounted on the inside surface of the housing cover.

FIG. 12 shows the PCB 108 mounted on the inside of the cover 110.

Figure 13:
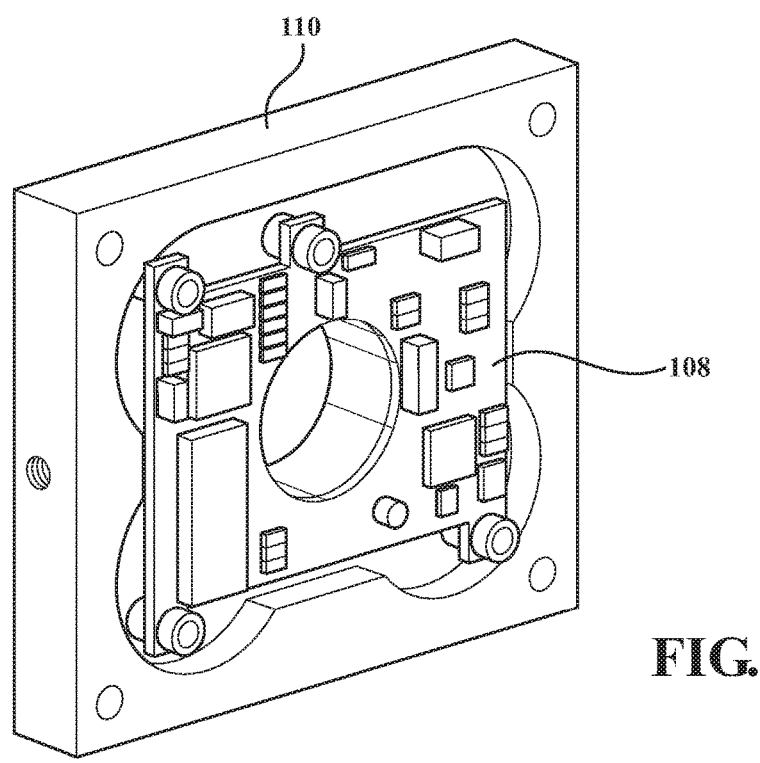
FIG. 13 shows how the PCB is mounted on the housing cover.

FIG. 13 shows in detail how the PCB 108 is mounted to the cover 110.

Figure 14:
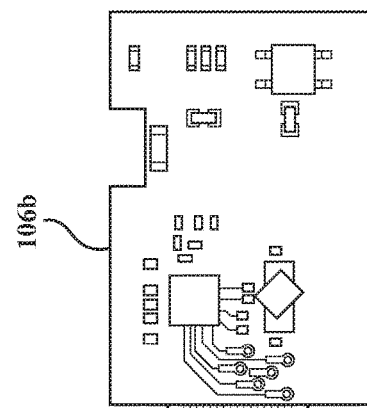
FIG. 14 shows the housing with the cover removed to reveal the shaft mounted PCB and the power input coil.

FIG. 14 shows in detail the interior of the sensor housing with cover removed; the two coil windings, i.e., primary and secondary are 114*a* and 114*b*, respectively.

Figure 15:
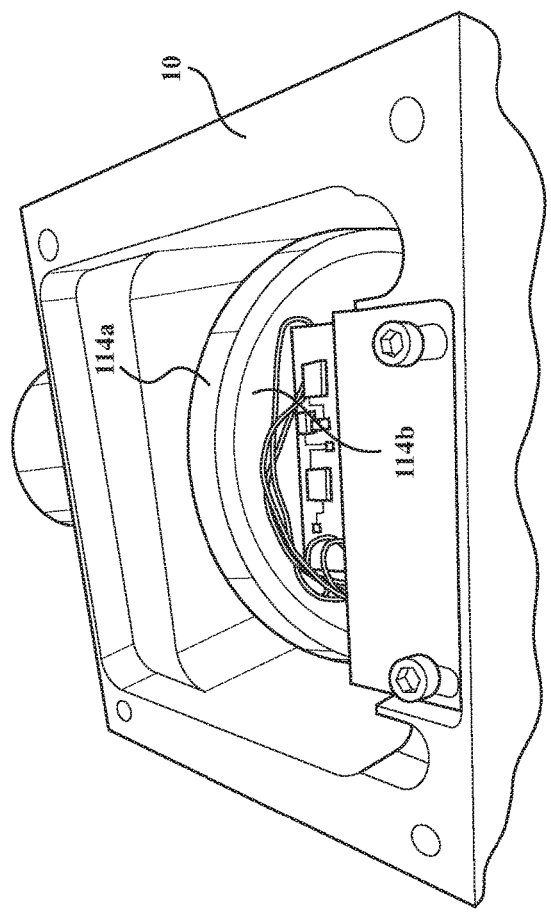
FIG. 15 shows two unmounted PCBs and the flex cable connector between them.
Figure 15:
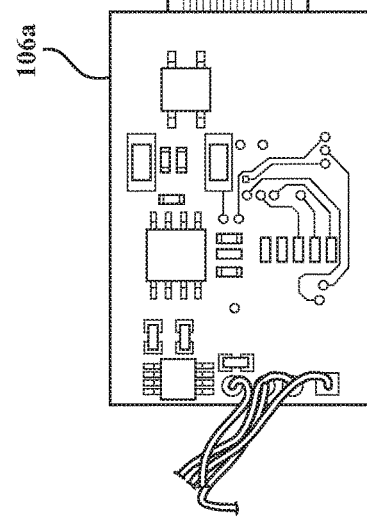

FIG. 15 shows the two PCBs before they are mounted on the shaft and interconnected by flex cable 201, as shown in FIG. 8.

Figure 16:
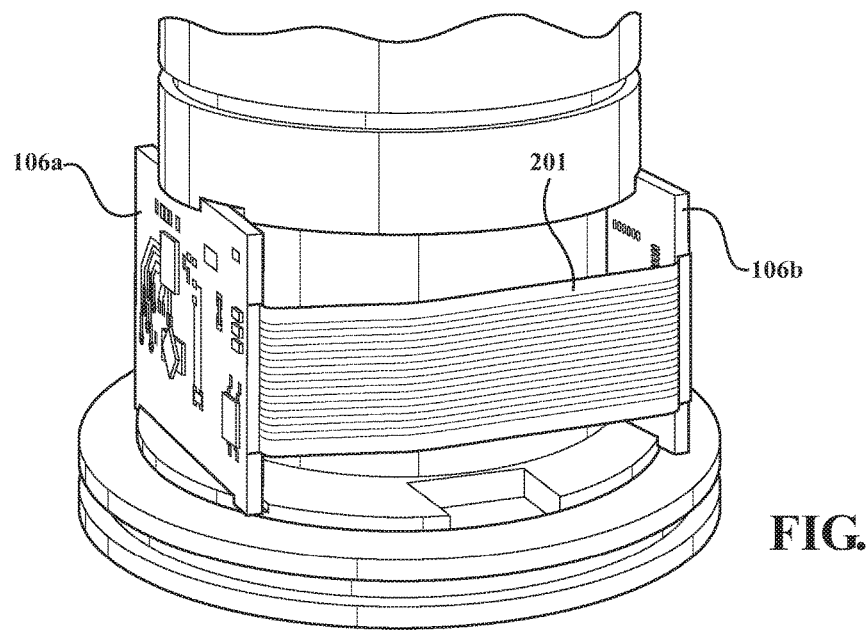
FIG. 16 shows the two PCBs of FIG. 15 mounted on the shaft.

FIG. 16 shows the two accelerometer PCBs 106*a* and 106*b* mounted on the shaft in the slots shown in FIG. 8.

Figure 17:
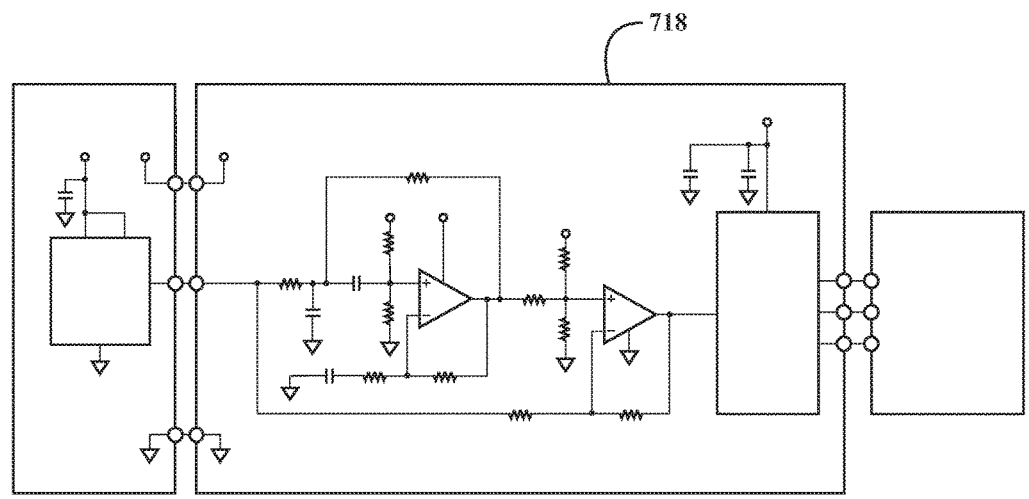
FIG. 17 is a circuit diagram of one of the two accelerometers used in the device described herein.

FIG. 17 shows the circuit diagram for the accelerometers 106*a* and 106*b* in the shaft-mounted PCBs 116. It is a commercially available product.

Figure 18:
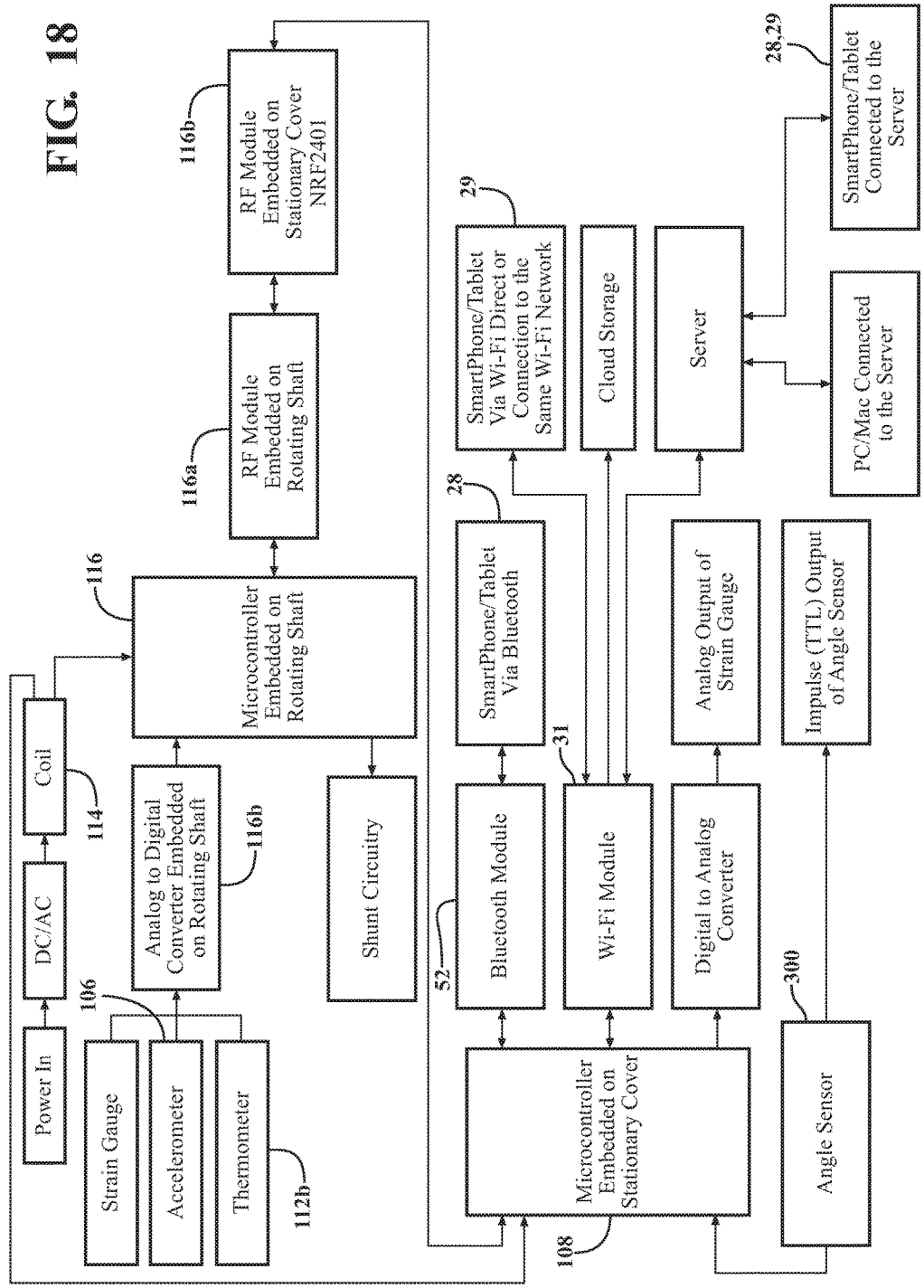
FIG. 18 is a block diagram of the overall system.

FIG. 18 is an overall system block diagram. The system as shown provides for DC power to be provided to the sensor 10; this power is converted by the housing-mounted PCB to AC for inductive coupling via coil 114*a*, 114*b* to the shaft-mounted PCBs, i.e., the outer half of the coil is stationary and acts as the "primary" while the inner half rotates with the shaft 106 and is the receiver or "secondary" coil. The AC power from the inner coil is converted back to DC for application to a Wheatstone bridge circuit 106*a* including the variable-resistance strain gages on the shaft flexure area. Torque and misalignment data are conveyed by rf coupling from the shaft-mounted PCB circuits 116*a* and 116*b* to the housing-mounted PCB circuits 108 from which this data can be sent via cable to any of the devices 18, 20, 22, 24, and 26 shown in FIG. 1, and by Wi-Fi and/or Bluetooth to smartphone 28 and/or tablet 29. Commands as described above can be generated by the user via smartphone 28 or tablet 29 and sent wirelessly to the housing mounted PCB and thereafter used to make the adjustments described above.

As stated above, FIG. 17 shows a circuit diagram for the accelerometers 106 which are mounted in slots on the shaft 112 to detect shaft misalignment during installation and/or misalignment and/or instability during high speed rotation. The accelerometer is a high performance wide bandwidth accelerometer identified as model number ADXL001 available from Analog Devices, Inc. A full product specification is available on the Analog Devices website.

The microcontrollers on the printer circuit boards 108 and 116 are PIC18F47J53 microcontrollers built in the torque sensor 10 as CPU, the specification sheets are available http://www.one.microchip.com/downloads/en/DeviceDoc/39964B.pdf. The rf module is nRF2401rf built into the torque sensor 10 to facilitate the communication between the rotating shaft and the stationary housing. The specification sheet is available at https://www.nordicsemi.com/eng/Products2.4 GHz-RF/nRF2401A.

A suitable Wi-Fi module is the CC3100 SimpleLink™ built into the torque sensor 10 to facilitate the Wi-Fi communication. A suitable Bluetooth module is the nRF8001 Bluetooth module and is built into the torque sensor 10 to facilitate the Bluetooth communication. The high efficiency coil is manufactured using 3F3 material to supply power to the electronic modules. In an implementation, the torque sensor 10 can use a computing device 118 to facilitate one- or two-way communications with a user device 28, such as a smartphone or tablet, a laptop computer 22, or the like, wherein the computing device 118 used by the torque sensor 10 can receive data from and transmit data to the torque sensor 10 via a network or software interface. For example, where wireless communication is implemented via Wi-Fi, the computing device 118 used by the torque sensor 10 can connect to a desired Wi-Fi network usable for communicating data. Where wireless communication is implemented via Bluetooth, the computing device 118 used by the torque sensor 10 can include a device identifier usable for pairing with the selected other computing device 118 over the Bluetooth protocol. In an implementation, a dedicated network interface component can be coupled to the torque sensor 10 so as to obviate the use of the facilitating computing device 118.

Overall operation is as follows: DC power is supplied by the user to the housing-mounted electronics. DC is converted to AC by the housing electronics and inductively coupled via coils 114a, 114b, to the shaft-mounted electronics. The shaft electronics convert part of the AC power back to DC for application to the Wheatstone bridge circuit including the strain gages in the center part of the shaft 8 and to the accelerometers for misalignment sensing. All bridge circuit signals (torque) and accelerometer signals (misalignment) are rf coupled to the housing-mounted PCB where outputs are provided to both cable outlet 16 and wireless antenna 26. The user can (a) read output data on Wi-Fi or Bluetooth devices 28, 29 and (b) wirelessly send commands back to the system to change units/limits/set points and other metrics as desired.

Figure 19:
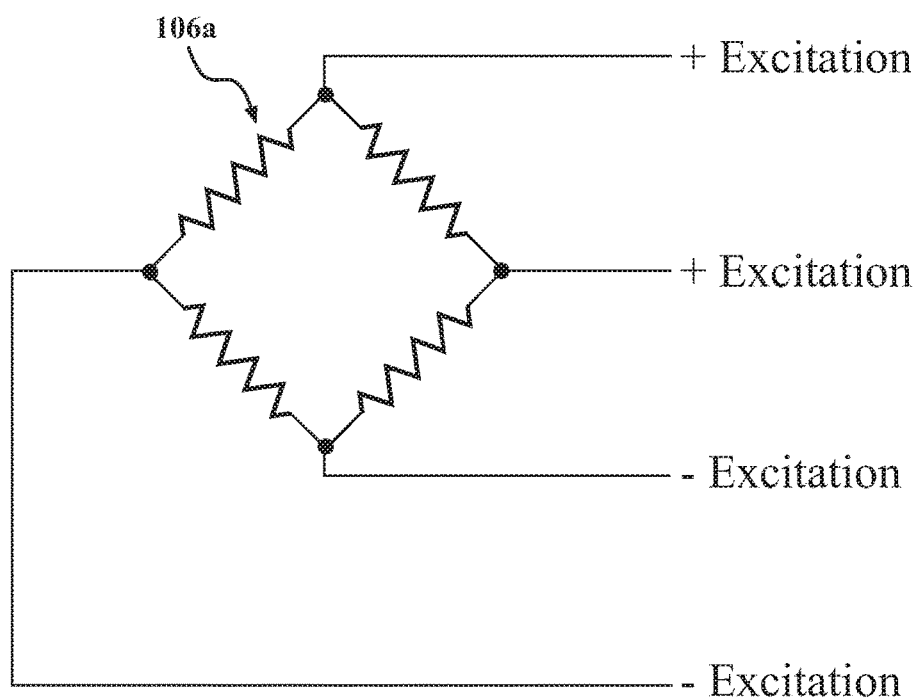
FIG. 19 shows a Wheatstone bridge circuit with strain gage sensors.

FIG. 19, as indicated above, shows a Wheatstone bridge circuit for the torque sensor static gages, here connected in parallel with a shunt 320. Periodic verification of strain gauges performance is required, of course, to assure the accuracy and/or linearity of the Torque sensor. Decreasing the resistance of a bridge arm by shunting with a larger resistor offers a simple, potentially accurate means of simulating the action of a strain gage. This method, known as shunt calibration is widely used in the industry for periodic verification of torque sensors performance. When the user send the commands for the "Shunt Calibration"; the microprocessor on the stationary housing sends a command to the microprocessor on the shaft via rf link. Then the microprocessor on the shaft triggers the switch ADG702L (See attached spec sheet), so the 70.1 ohms shunt resistor kicks in to the -Excitation and -Signal leg of the Wheatstone bridge (See attached FIG.). Therefore, the resistance of the mentioned leg is decreased as if a mechanical load is being applied to the bridge. Consequently, the induced signal will be processed by the A/D on the shaft and then microprocessor on the shaft. Afterwards, the induced signal gets transmitted to the microprocessor on the stationary housing via rf link. The microprocessor on the stationary housing broadcasts the induced signal via Bluetooth/Wi-Fi/Analog output. The user could compare the output with the reference output provided by FUTEK conducted in the controlled lab & during calibration to see how well the torque sensor performs. The user may send the "shunt calibration" command through the Mobile App.

While the present disclosure has been described in connection with certain embodiments, it is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A torque sensing system comprising:
   a torque transmitting device having a housing with a cover, a shaft instrumented for producing first electrical signals related to torque instantaneously being transmitted through the shaft from a source of mechanical power to a mechanical load, and second electrical signals related to misalignments of said shaft;
   a shaft-mounted processor for converting said first and second signals to rf form, a housing-mounted processor on receiving rf data signals from the shaft-mounted processor, said shaft-mounted and housing-mounted processors being coupled by rf technology to transfer said first and second signals from the rotating shaft to the housing-mounted processor, said housing-mounted processor including an antenna for broadcasting data derived from said signals via a Wi-Fi or Bluetooth wireless communication protocol to a computing device having input capabilities for displaying said broadcast data and for inputting data commands to the housing processor; and
   said system further comprising a two-part inductive coil, a primary part of the coil being mounted on the housing and a secondary part of the coil be mounted on the shaft to inductively receive power from the primary coil part and provide said power to the shaft mounted processor.

2. The system described in claim 1 further including at least one accelerometer mounted on the shaft for producing said second electrical signals indicating shaft misalignment, said accelerometer being coupled to the shaft-mounted processor to convey misalignment data to the housing-mounted processor for wireless communication to a receiving device including one or both of a smartphone or tablet.

3. The system described in claim 2 wherein the accelerometer is mounted on a PCB that is installed on said shaft.

4. The system described in claim 3 further including a second accelerometer mounted on the shaft for sensing misalignment in operation.

5. A torque sensor as defined in claim 1 further including a Wheatstone bridge circuit including a strain gage mounted on the shaft, and a shunt circuit connected in parallel to the strain gage for calibration.

* * * * *